United States Patent [19]

Schlatter

[11] 3,776,024

[45] Dec. 4, 1973

[54] DENSITOMETER COMPONENTS

[75] Inventor: Gerald Lance Schlatter, Boulder, Colo.

[73] Assignee: International Telephone and Telegraph Corporation, New York, N.Y.

[22] Filed: July 9, 1971

[21] Appl. No.: 161,025

[52] U.S. Cl. ................................................. 73/32
[51] Int. Cl. ............................................... G01n 9/00
[58] Field of Search ...................... 73/32, 67.1, 67.2

[56] References Cited
UNITED STATES PATENTS

| | | | |
|---|---|---|---|
| 2,635,462 | 4/1953 | Pode et al. | 73/32 |
| 3,117,440 | 1/1964 | Wilner | 73/32 |
| 3,307,408 | 3/1967 | Thomas et al. | 73/462 |
| 3,426,593 | 2/1969 | Jacobs | 73/32 X |
| 3,444,723 | 5/1969 | Wakefield | 73/32 |

FOREIGN PATENTS OR APPLICATIONS

| | | | |
|---|---|---|---|
| 129,537 | 6/1959 | U.S.S.R. | 73/194 B |

*Primary Examiner*—Richard C. Queisser
*Assistant Examiner*—Arthur E. Korkosz
*Attorney*—C. Cornell Remsen, Jr. et al.

[57] ABSTRACT

A vibration densitometer including a vane adapted to be vibrated, a driver coil located around a magnetostrictive body to vibrate the vane, and a piezoelectric crystal to detect the vane vibrations. A loop connects the crystal to the coil, the loop having a tracking filter to pass the resonant frequency of the crystal output. A linearization circuit is connected from the filter output to produce an analog voltage directly proportional to the density of the fluid in which the vane is located. A switch is actuable to clamp the circuit output to a constant magnitude to indicate the lack of resonance. The switch is actuated by a synchronous detector connected from the input and output of the tracking filter. An alternating signal is transformer coupled to an input circuit with rectification to provide an isolated source of potential without the use of a power supply.

10 Claims, 12 Drawing Figures

INVENTOR
GERALD L. SCHLATTER
BY:
ATTORNEY

INVENTOR
GERALD L. SCHLATTER
BY:
ATTORNEY

INVENTOR
GERALD L. SCHLATTER
BY:
ATTORNEY

INVENTOR
GERALD L. SCHLATTER
ATTORNEY

DENSITOMETER COMPONENTS

BACKGROUND OF THE INVENTION

This invention relates to the art of measuring the density of a fluid or the like, and more particularly, to vibration densitometer circuits.

In the past, the density of a fluid has been determined by measuring the resonant frequency of a vibrating structure in a vibration densitometer. For various reasons, e.g. when it is removed from a liquid and placed in air, the densitometer structure will not vibrate within the range of the instrument. The output, therefore, wanders and the condition is not clearly indicated.

Another disadvantage of the prior art concerns a safety requirement of circuit isolation. This makes it necessary to provide two power supplies.

SUMMARY OF THE INVENTION

In accordance with the device of the present invention, the above-described and other disadvantages of the prior art are overcome by providing means to hold the densitometer output constant when it is not resonating.

Another feature of the invention resides in a transformer coupled signal output to provide a source of power without the need for a power supply.

The above-described and other advantages of the present invention will be better understood from the following detailed description when considered in connection with the accompany drawings.

BRIEF DESCRIPTION OF THE DRAWINGS

In the drawings which are to be regarded as merely illustrative

DESCRIPTION OF THE PREFERRED EMBODIMENT

Figure 1:
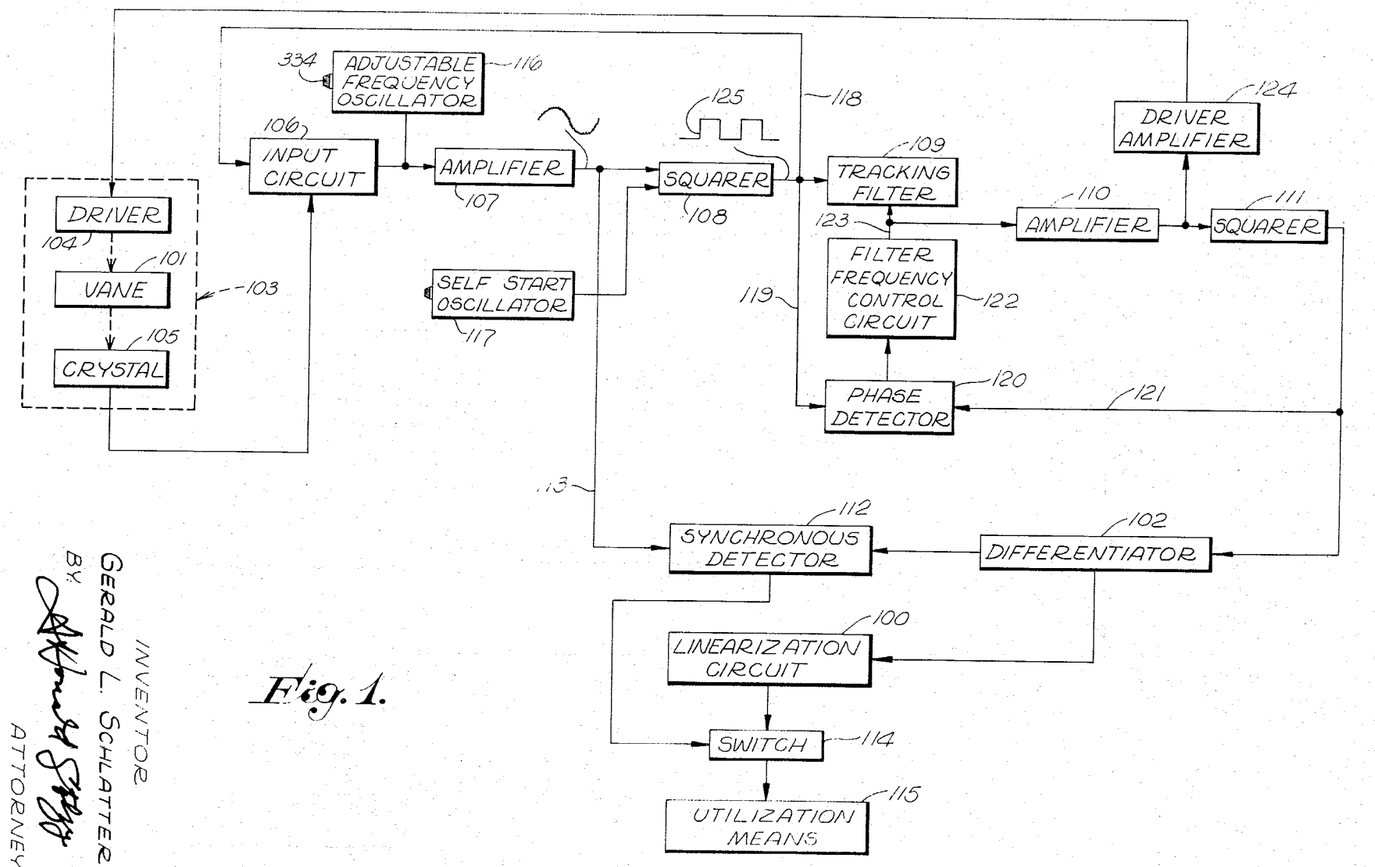
FIG. 1 is a block diagram of one embodiment of the present invention.

In FIG. 1, a vibration densitometer probe 103 is shown including a magnetostrictive driver 104, a vane 101 and a piezoelectric crystal 105.

Probe 103 may be identical to that disclosed in copending application Ser. No. 65,371 filed Aug. 20, 1970, now U.S. Pat. No. 3,677,067 for DENSITOMETER by C. E. Miller and G. L. Schlatter. The entire disclosure of this application is hereby incorporated by this reference hereto into the present application. The same is true of copending application Ser. No. 131,131 filed Apr. 5, 1971, for DENSITOMETER AND CALIBRATION METHOD AND APPARATUS THEREFOR by G. L. Schlatter.

The output of crystal 105 is connected to an input circuit 106. An amplifier 107, a squarer 108, a tracking filter 109, an amplifier 110 and a squarer 111 are connected to a differentiator 102. Outputs of the differentiator 102 are connected to a synchronous detector 112 and to a linearization circuit 100. Synchronous detector 112 also receives an input over a lead 113 from the output of amplifier 107. The output of the synchronous detector 112 controls a switch 114 connected between linearization circuit 100 and utilization means 115. An adjustable frequency oscillator 116 is connected to the input of amplifier 107. A self-start oscillator 117 is connected to squarer 108. The output of squarer 108 is impressed over a lead 118 on input circuit 106, and over a lead 119 on a phase detector 120. Phase detector 120 receives a second input on a lead 121 connected from the output of squarer 111. A filter frequency control circuit 122 is connected from the output of phase detector 120 to the control input of cracking filter 109. The output lead 123 of circuit 122 forms both the control input of filter 109 and the filtered output thereof, as will be described.

A driver amplifier 124 is connected from the output of amplifier 110 to driver 104.

As will be explained, input circuit 106 contains a differentiator which produces an output signal 90° out of phase with the output signal of crystal 105. The output signal of tracking filter 109, introduced to amplifier 110, is also 90° out of phase with the input signal to tracking filter 109 from squarer 108. The two 90° phase shifts produced in input circuit 106 and tracking filter 109 make it a simple matter to connect the output of driver amplifier 124 to driver 104 in a manner to obtain resonance. That is, vane 101 is driven at its natural resonant frequency.

Driver amplifier 124 produces an alternating output voltage whose average amplitude is somewhat above or below zero. That is, it has a conventional D.C. bias as explained in many publications including, but not limited to, *Magnetostriction Transducers*, published by the International Nickel Company, Inc., 67 Wall Street, New York, N.Y. 10005. See also, for example, the bibliography of this one publication. The D.C. bias is employed to keep the current flow through driver coil 104 in one direction only and to keep the frequency of the output voltage of crystal 105 equal to that of the input voltage to the driver coil 104.

As will be explained, lead 118 supplies an isolated source of potential to input circuit 106.

Oscillator 116 is employed in calibration, as will be explained.

Oscillator 117 is employed to insure self-starting. Synchronous detector 112 causes switch 114 to clamp the output of circuit 110 to a constant value when resonance does not occur.

Utilization means 115 may take any of several desired forms. When switch 114 passes the output of circuit 100, this output is directly proportional to the density of the fluid in which the probe 103 is submerged. Utilization means 115 may thus be a voltmeter or ammeter calibrated in density, as desired. Alternatively, utilization means 115 may be a process controller.

OPERATION

In the operation of the embodiment of the invention shown in FIG. 1, probe 103 is submerged in a fluid. Self-start oscillator 107 causes vane 101 to be driven to its resonant frequency. This frequency appears as a square wave 125 at the output of squarer 108. Filter 109 has a passband which is movable in accordance with a signal transmitted thereto on lead 123. The passband of filter 109 is thus centered on the frequency of the pulses at 125. This is done by phase detector 120 which compares the filter output to the filter input and causes circuit 122 to vary the passband location of filter 109 in accordance with the difference therebetween.

Linearization circuit 100 produces an output signal directly proportional to density. Synchronous detector 112 suppresses the output of circuit 100 through switch 114 when resonance does not occur.

Switch 114, in actuality, grounds the output of circuit 100 or applies it directly to utilization means 114 depending upon the output signal of synchronous detector 112.

Figure 2:
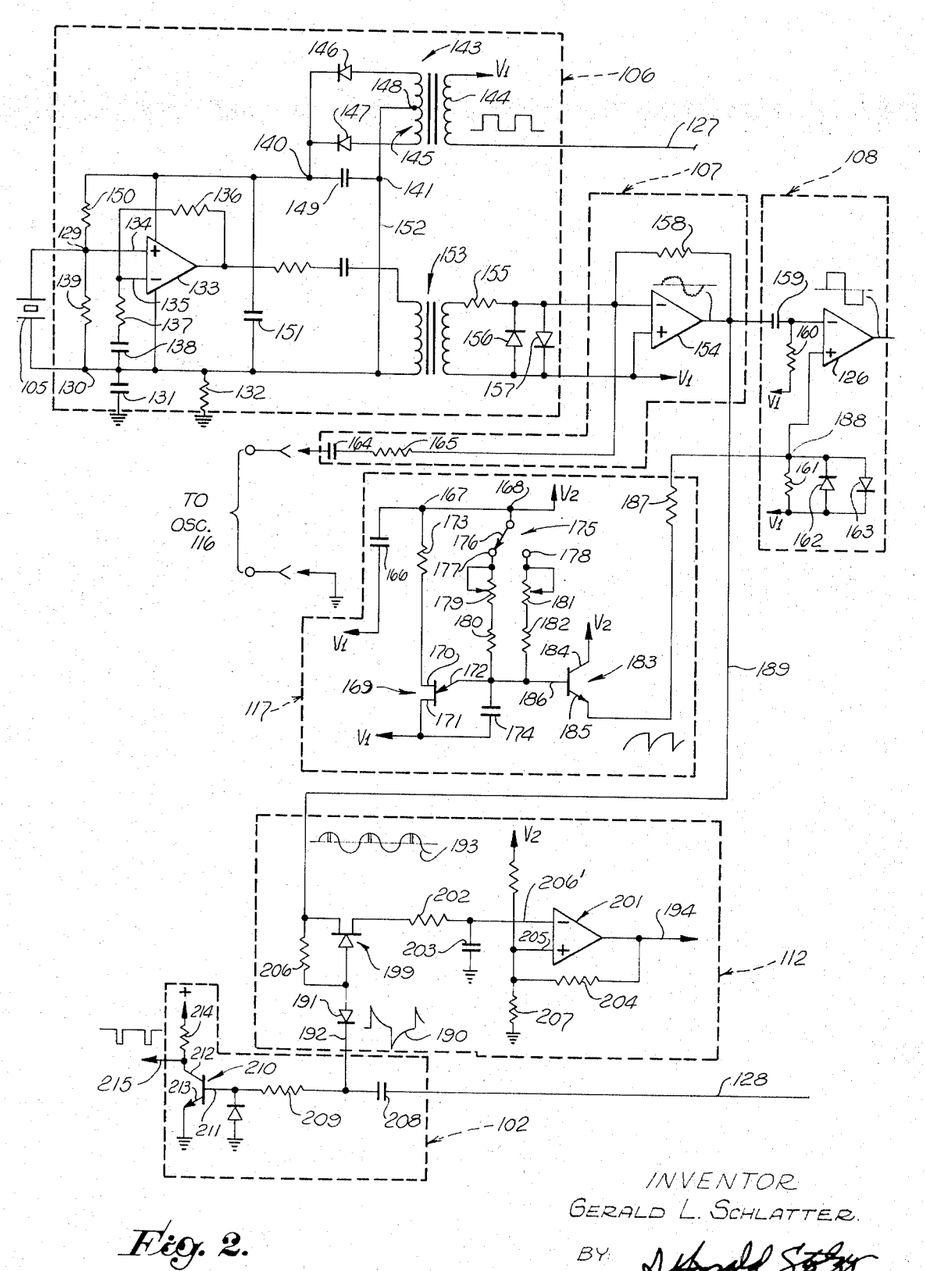
FIG. 2 is a schematic diagram of a portion of the blocks shown in FIG. 1.
Figure 3:
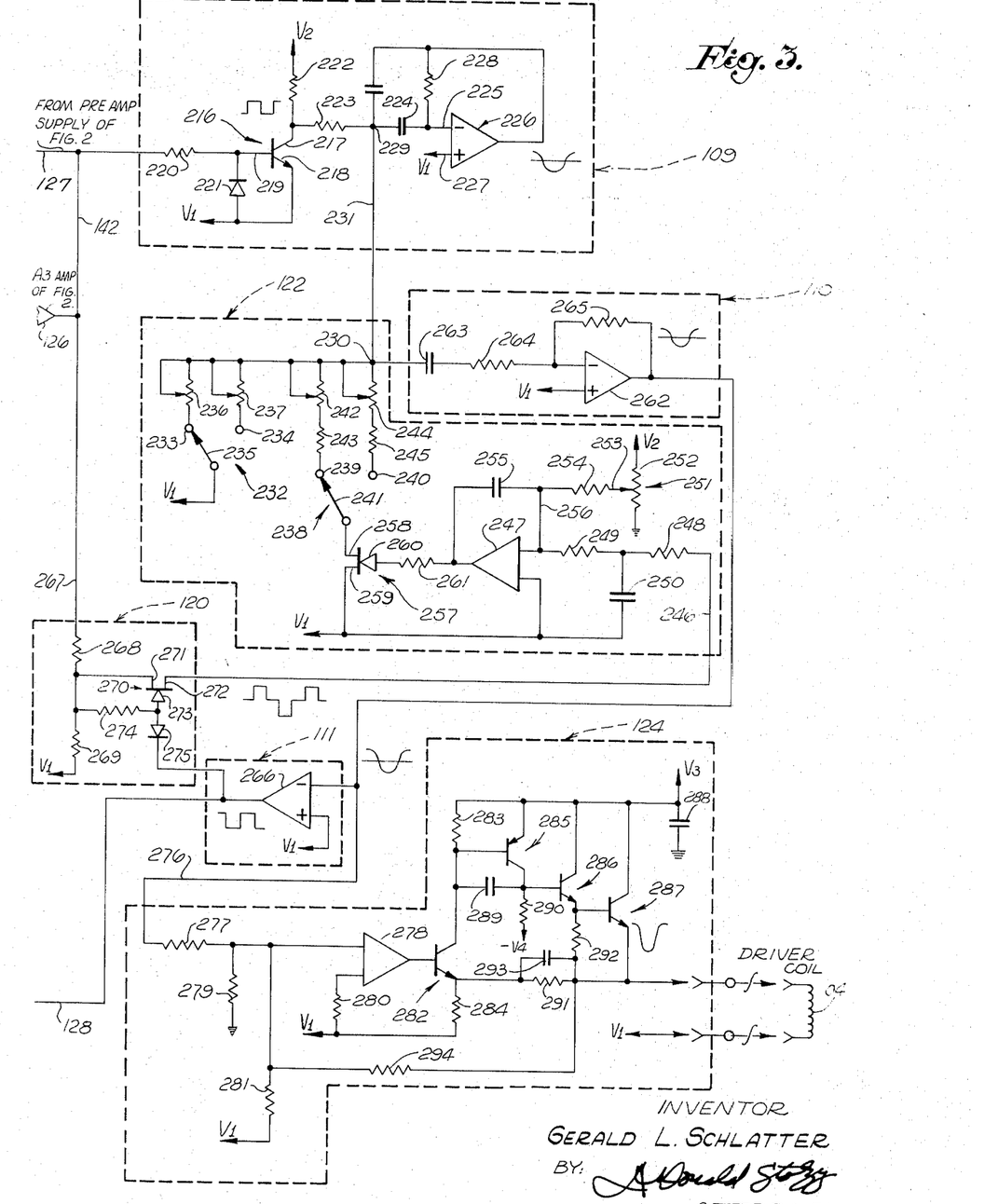
FIG. 3 is a schematic diagram of a portion of other blocks shown in FIG. 1.

If FIG. 2 is placed immediately to the left of FIG. 3, it will be noted that the leads fit together. For example, amplifier 126 is duplicated in both FIGS. 2 and 3 for clarity. The same is true of lead 127 and lead 128.

In FIG. 2, input circuit 106 is shown connected from crystal 105. Also shown are amplifier 107, squarer 108, oscillator 117, synchronous detector 112 and differentiator 102.

In FIG. 3, tracking filter 109 is shown with circuit 122, amplifier 110, phase detector 120, squarer 111 and driver amplifier 124.

In FIG. 2, input circuit 106 is connected from crystal 105 at junctions 129 and 130. A capacitor 131 and a resistor 132 are connected from junction 130 to ground. A differential amplifier 133 has a plus input 134 and a minus input 135. A feedback resistor 136 is connected from the amplifier output to the minus input 135. A resistor 137 and a capacitor 138 are connected from the minus input 135 to junction 130. A resistor 139 is connected between junctions 129 and 130.

Input circuit 106 has power input terminals 140 and 141 connected from the output of amplifier 126 over a lead 142 and lead 127 to a transformer 143. Transformer 143 has a primary winding 144 connected from lead 127, and a secondary winding 145 with its ends connected to terminal 140 through diodes 146 and 147. Secondary 145 has a center tap 148 connected to terminal 141. A capacitor 149 is connected between terminals 140 and 141 to reduce the ripple. A resistor 150 is connected from junction 129 to terminal 140. A capacitor 151 is connected between terminal 140 and junction 130. A lead 152 connects terminal 141 to junction 130. The output of the circuit 106 is transformer coupled at 153 to an amplifier 154 in box 107 through a resistor 155 and diodes 156 and 157. Amplifier 154 has a feedback resistor 158. Squarer 108 is connected from the output of amplifier 154, and includes a coupling capacitor 159, a bias resistor 160, a bias resistor 161 and diodes 162 and 163.

Amplifier 107 has a coupling capacitor 164 and a series resistor 165 connected from oscillator 116.

Oscillator 117 includes a capacitor 166 connected to a source of potential V1. Junctions 167 and 168 are made at a potential V2. A unijunction transistor 169 has a base 170, a base 171 and an emitter 172. A resistor 173 is connected between junction 167 and base 170. Base 171 is connected to source of potential V1. A capacitor 174 is connected between emitter 172 and V1. A single-pole, double-throw switch 175 has a pole 176, and contacts 177 and 178. A potentiometer 179 and a resistor 180 are connected from contact 177 to emitter 172. A potentiometer 181 and a resistor 182 are connected from contact 178 to emitter 172.

Figure 4:
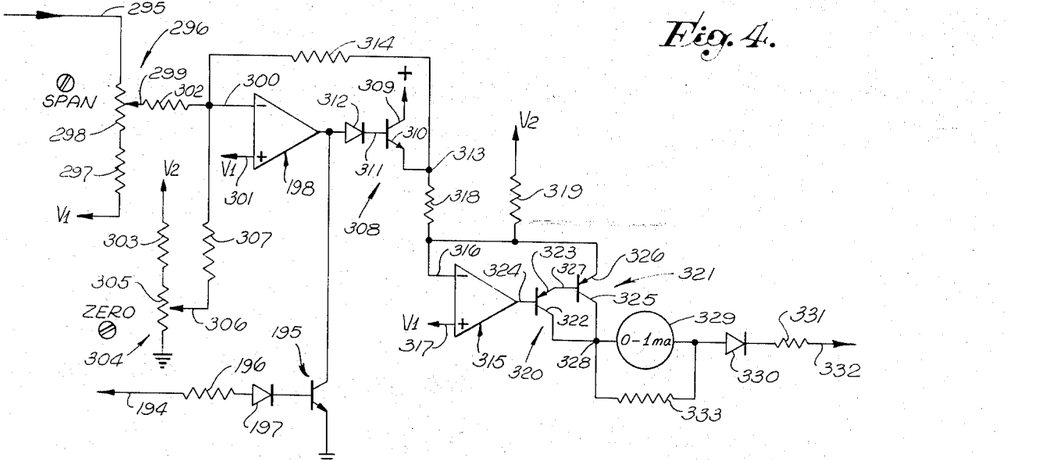
FIG. 4 is a schematic diagram of still another block shown in FIG. 1.

An output transistor 183 is provided including a collector 184, an emitter 185 and a base 186. Base 186 is connected from emitter 172. Collector 184 is connected to source V2. Emitter 185 is connected through a resistor 187 to a junction 188 with resistor 161. Synchronous detector 112 is connected over a lead 189 from the output of amplifier 154. Waveform 190 is applied to detector 112 through a diode 191 over a lead 192. This causes the signal indicated at 193 on lead 189 to be sampled. If there is peak detection, an output appears at a lead 194 which is connected to a transistor 195 through a resistor 196 and a diode 197, as shown in FIG. 4. In such a case, transistor 195 does not shunt the amplifier 198 to ground. It otherwise does.

In detector 112 in FIG. 2, sampling is accomplished by a field effect transistor 199 across which a resistor 206 is connected.

The output of field effect transistor 199 is connected to an amplifier 201 through a resistor 202 and a shunt capacitor 203. Amplifier 201 has a feedback resistor 204. Amplifier 201 has a plus input lead 205, and a minus input lead 206. Plus input lead 205 is connected to ground through a resistor 207.

Differentiator 102 includes a capacitor 208 connected in series with lead 128, a resistor 209 and a transistor 210. Transistor 210 has a base 211, a collector 212 and an emitter 213. Base 211 is connected from resistor 209. Emitter 213 is grounded. Collector 212 is connected to a positive source of potential through a resistor 214. A lead 215 is connected from collector 212 to linearization circuit 100. That is, lead 215 is the same as that shown in FIGS. 5 and 6.

Switch 175 in oscillator 117 is employed to select either one of two frequencies. As will be explained, filter 109 may be controlled to operate within two band limits. The frequency of oscillator 117 is always set to be at the mid-point between the filter band limits. The amplitude of the output signal of amplifier 126 due to the output signal of oscillator 117 is also arranged to be less than the amplitude of the resonant frequency signal when resonance occurs.

Throughout the drawings, V2 may be 24 volts, and V1 may be 12 volts.

In FIG. 3, filter 109 includes a transistor 216 having a collector 217, an emitter 218 and a base 219. A resistor 220 is connected from lead 127 to base 219. A diode 221 is connected from base 219 to emitter 218. Emitter 218 is maintained at potential V1. A resistor 222 is connected from collector 217 to potential V2. A resistor 223 and a capacitor 224 are connected from collector 217 to the minus input 225 of an amplifier 226. The plus input 227 of amplifier 226 is connected to potential V1. A feedback resistor 228 is connected across amplifier 226. Filter 109 has a junction 229 which is connected to junction 230 in circuit 122 by a lead 231. A single-pole, double-throw switch 232 has contacts 233 and 234, and a pole 235. Potentiometers 236 and 237 are connected from junction 230 to contacts 233 and 234, respectively. A single-pole, double-throw switch 238 has contacts 239 and 240, and a pole 241. A potentiometer 242 and a resistor 243 are connected from junction 230 to contact 239. A potentiometer 244 and a resistor 245 are connected from junction 230 to contact 240. The pole 235 is connected to potential V1. The input to circuit 122 is provided by phase detector 120 on a lead 246 to an amplifier 247 through resistors 248 and 249. A capacitor 250 is connected from the junction of resistors 248 and 249 to potential V1. A potentiometer 251 having a winding 252 and a wiper 253 is connected from potential V2 to ground. A resistor 254 and a capacitor 255 are connected from wiper 253 to the output of amplifier 247. Resistors 249 and 254 are connected together by a lead 256. Circuit 122 has a field effect transistor 257 including a drain 258, a source 259 and a gate 260. A resistor 261 is connected from the output of amplifier 247 to gate 260. Source 259 is connected to potential V1. Drain 258 is connected to pole 241.

In amplifier 110, an amplifier 262 is connected from junction 230 through a capacitor 263 and a resistor 264. Amplifier 262 has a feedback resistor 265.

Squarer 111 includes simply an amplifier 266 driven to saturation. The output of amplifier 126 is impressed upon phase detector 120 on a lead 267 connected to resistors 268 and 269, resistor 269 being connected to potential V1. Phase detector 120 has a field effect transistor 270 with a drain 271, a source 272 and a gate 273. Drain 271 is connected from resistor 268. A resistor 274 connects resistor 268 to gate 273. A diode 275 is connected from the output of amplifier 266 to gate 273. Source 272 is connected to lead 246. The output of amplifier 262 in amplifier 110 is impressed upon driver amplifier 124 over a lead 276 through a resistor 277 to an amplifier 278. Resistor 277 is connected to ground through a resistor 279. A resistor 280 is connected from amplifier 278 to potential V1. Amplifier 278 is connected to potential V1 through a resistor 281.

A transistor 282 has a collector emitter in series with V3 and V1 through a collector resistor 283 and an emitter resistor 284. Transistors are provided at 285, 286 and 287. The emitter of transistor 285 is connected to potential V3. A capacitor 288 connects potential V3 to ground. The collectors of transistors 286 and 287 are connected to potential V3. A capacitor 289 connects the collector of transistor 282 to the collector of transistor 285. A resistor 290 connects the collector of transistor 285 to a negative potential. The emitter of transistor 282 is connected to one side of the driver coil 104 by a resistor 291. A resistor 292 connects the emitter of transistor 286 to the driver coil 104. A capacitor 293 is connected in parallel with resistor 291. The other side of the driver coil is connected to potential V1. The emitter of transistor 287 is connected to one side of the driver coil 104. Resistor 281 is connected by resistor 294 to the driver coil 104.

Figure 5:
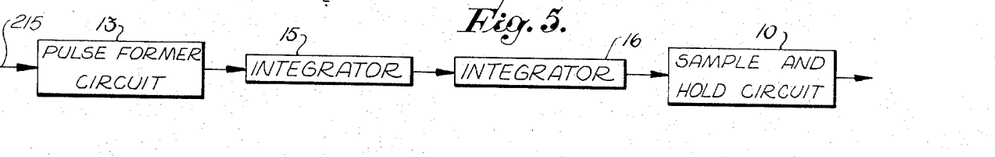
FIG. 5 is a detailed block diagram of one of the blocks shown in FIG. 1.

In FIG. 5, linearization circuit 100 of FIG. 1 is shown including a pulse former circuit 13, a first integrator 15, a second integrator 16 and a sample and hold circuit 10 connected in succession.

Figure 6:
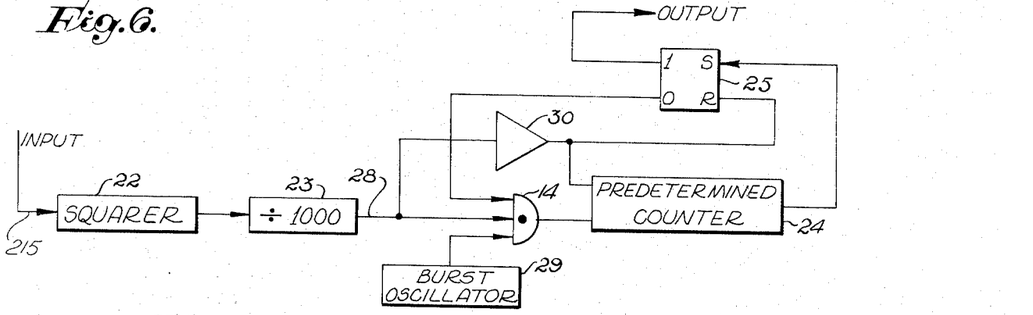
FIG. 6 is a block diagram of a pulse former circuit shown in FIG. 5.
Figure 8:
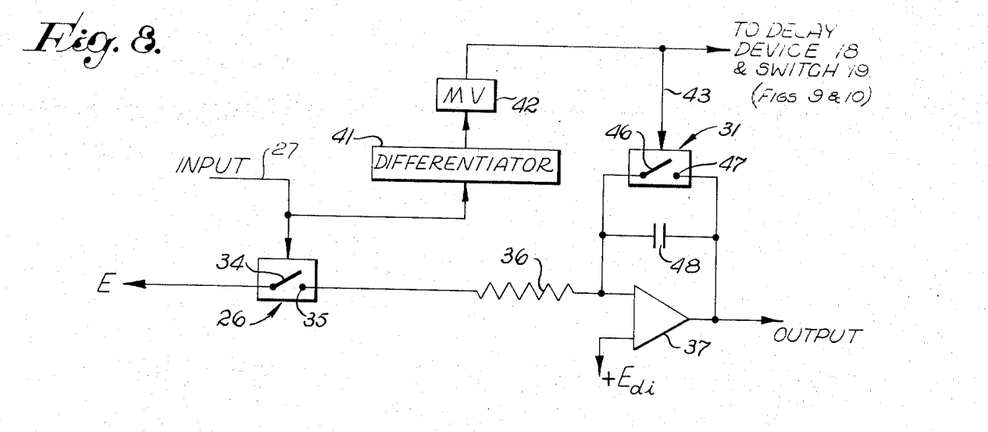
FIGS. 8 and 9 are schematic diagrams of integrators shown in FIG. 5.

As shown in FIG. 6, pulse former circuit 13 includes a squarer 22, a frequency divider 23, an AND gate 14, a predetermined counter 24 and a flip-flop 25, all of which are connected from differentiator 102 in FIG. 1 to a switch 26 in FIG. 8. The "1" output of flip-flop 25 is connected to an input lead 27 of switch 26. All the switches 26, 31, 32, 33 and 19, shown in FIGS. 8, 9 and 10, may be electromechanical or electrical, but preferably are electronic switches including, but not limited to, transistor switches. Thus, the signal on input lead 27 of switch 26 closes switch 26 when the 1 output of flip-flop 25 is high.

A burst oscillator 29, shown in FIG. 6, is connected to a second input of gate 14. The "0" output of flip-flop 25 is connected to a third input of gate 14. The output of gate 14 is connected to the input of counter 24 in FIG. 6. An inverter 30 is connected from lead 28 to the reset input of flip-flop 25. The output of inverter 30 is also connected to the reset input of counter 24.

Figure 11:
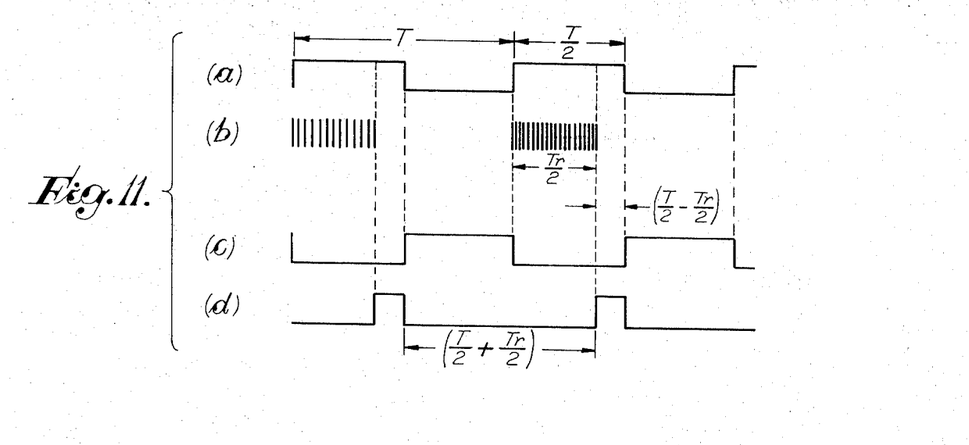
FIGS. 11 and 12 are graphs of groups of waveforms characteristic of the operation of the invention.

The operation of the pulse former circuit 13 of FIG. 6 may, perhaps, be best understood from the waveforms shown in FIG. 11. Pulse former circuit 13 converts waveform (a) to waveform (d). The output of divider 23 is indicated by waveform (a). The output of gate 14 is indicated by waveform (b). Gate 14 passes a burst of pulses from oscillator 29 to counter 24 over a period which may be called $T_r/2$. The high output of divider 23 keeps gate 14 open. Initially, flip-flop 25 is in the 0 state and thus does not inhibit gate 14. Counter 24 then counts up the pulses in a burst and stops counting a period of time $T_r/2$ after the leading edge of each output pulse of divider 23. Counter 24 may be adjustable as to its predetermined count, if desired. Burst oscillator 29 produces pulses at a highly stable, constant high frequency.

Once the burst of pulses has been counted, counter 24 sets flip-flop 25 to the 1 state. The 0 output of flip-flop 25 then goes low and inhibits gate 14. No further pulses are then introduced to counter 24 until the leading edge of the next output pulse from divider 23. The output of inverter 30 is shown in waveform (c). When waveform (a) goes low, waveform (c) goes high, and both counter 24 and flip-flop 25 are reset. The 1 output of flip-flop 25 is thus illustrated in waveform (d).

Figure 9:
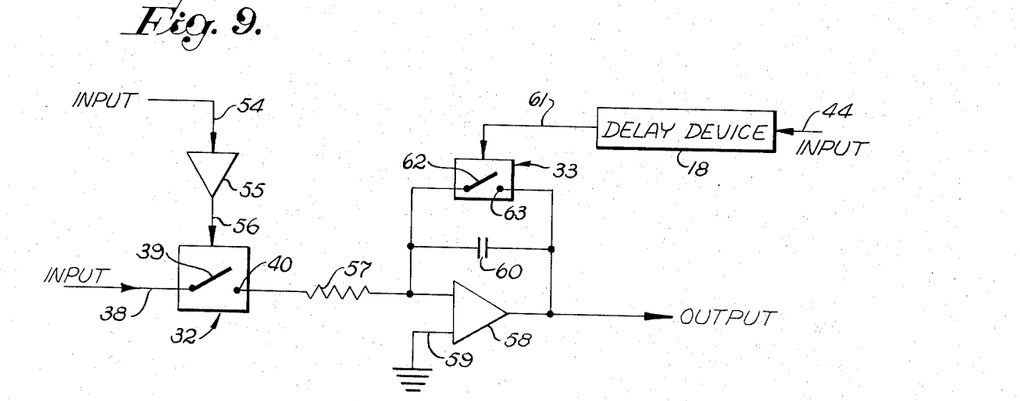
Figure 10:
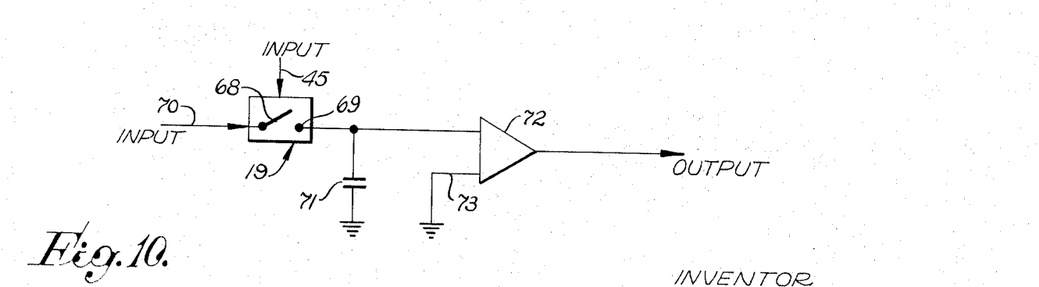
FIG. 10 is a schematic diagram of a sample and hold circuit shown in FIG. 5.

As will be evident from the following description, the vertical input leads to switches 26, 31, 32, 33 and 19, shown in FIGS. 8, 9 and 10, represent the actuating input leads. As described previously, the actuating input lead carries a voltage which, when high, causes the switch to close. Switch 26 has an arm 34 and a contact 35. A constant voltage, E, is connected to arm 34. A resistor 36 is connected between contact 35 and one input of a differential amplifier 37. The other input of differential amplifier 37 is connected to a constant voltage, $+E_{di}$. The input to switch 26 on lead 27 is connected from the 1 output of flip-flop 25, shown in FIG. 6, as stated previously. The output of amplifier 37, in FIG. 8, is connected to an input lead 38 connected to an arm 39 of the switch 32, switch 32 having a contact 40.

Figure 7:
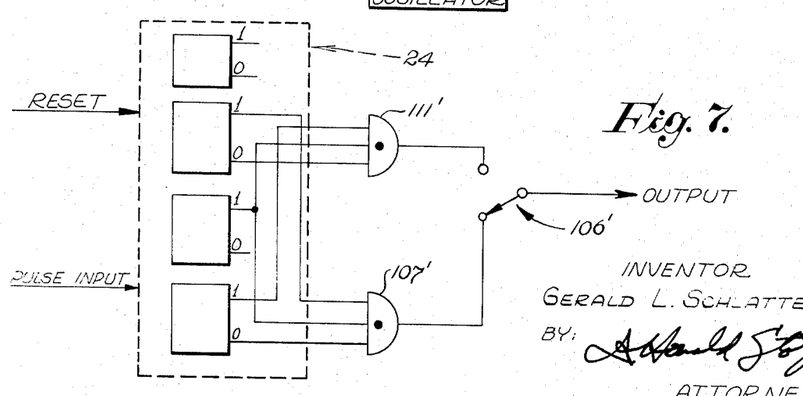
FIG. 7 is a block diagram of a predetermined counter shown in FIG. 6.

The counter 24, as shown in FIG. 7, may have either one of two predetermined counts determined by the position of single-pole, double-throw switch 106'. Two AND gates 107' and 111' are provided for two different corresponding counts.

In FIG. 8, first integrator 15 is shown including a differentiator 41 connected from lead 27 to a monostable multivibrator 42. The output of multivibrator 42 is connected to the actuating lead 43 of switch 31. The output of multivibrator 42 is also connected to an input lead 44 of a delay device 18 shown in FIG. 9, and to an actuating input lead 45 of switch 19, shown in FIG. 20.

In FIG. 8, switch 31 has an arm 46 and a contact 47. A capacitor 48 is connected from the output of amplifier 37 to the one input thereof to which resistor 36 is connected. Arm 46 is connected to the said one input of amplifier 37, and contact 47 is connected to the output thereof.

In the operation of the first integrator 15, shown in FIG. 8, the input to switch 26 on lead 27 closes switch 26 each time and a length of time that flip-flop 25 is in the 1 state. That is, switch 26 is closed during the widths of the pulses indicated in waveform (d). The integrator of FIG. 8, therefore, integrates during at least a portion of this time. However, due to the fact that integration is performed not only during the pulses of waveform (d), but also during the time between those pulses, one of the first and second integrators 15 and 16 of FIGS. 8 and 9, respectively, must be reset during its own integration interval. It is during this interval of the first integrator that such resetting takes place.

Differentiator 41 produces an output pulse at the leading edge of each of the pulses in waveform (d). Multivibrator 42 then produces an output pulse having a leading edge coinciding with the leading edge of each of the pulses of waveform (d) and having a trailing edge occurring before the trailing edges of the pulses of waveform (d). The output of multivibrator 42 is indicated by waveform (f) in FIG. 12. Waveform (e) is the same as waveform (d) although the scale thereof has been changed for clarity.

Receipt by switch 31 of the output of multivibrator 42 causes the capacitor 48 to discharge. Capacitor 48 is thus shunted through switch 31.

If capacitor 48 were completely discharged, at a time, $t_1$, shown in FIG. 11, the integrator would integrate from the zero line, $V_o$, starting at time, $t_1$. Since it is the object of the integrator of FIG. 8 to produce a maximum output at a time, $t_2$, which is directly proportional to the time width of pulse 49 shown in FIG. 8, an error would be introduced because the time $(t_1 - t_0)$ would be omitted.

In accordance with the device of the present invention, this error is eliminated by preventing the output of amplifier 37 from falling below a predetermined constant voltage, $E_d$. This is done by supplying a suitable bias to amplifier 37, i.e. $E_{di}$. This provides the bias sufficient to maintain $E_d = St_r$, where S is the slope of line 50, and $t_r = t_1 - t_0$. Note that the line 50 thus extends precisely through the point $t_o$, $V_o$ and makes the integration accurate for the entire width of pulse 49.

Figure 12:
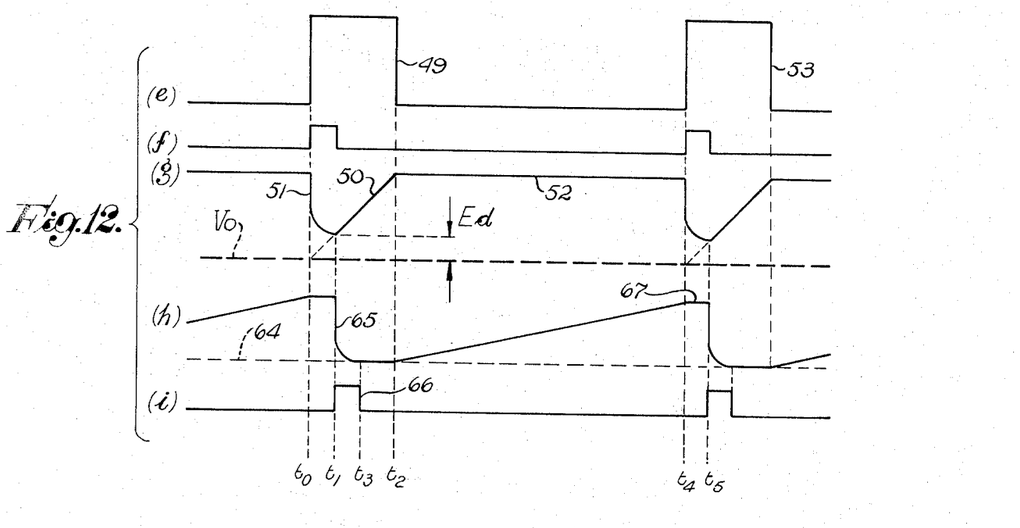

In accordance with the foregoing, as shown in FIG. 12, the output of amplifier 37 drops along the line 51, integrates along the line 50 and remains constant at 52 over a period between the trailing edge of pulse 49 and the leading edge of pulse 53. The output of amplifier 37 remains constant during the interval along the line 52 because during this period switch 26 is opened.

In FIG. 9, second integrator 16 is shown including an input lead 54 connected from the 1 output of flip-flop 25. An inverter 55 is connected from lead 54 to the actuating input lead 56 of switch 32. As stated previously, input lead 38 is connected from the output of amplifier 37. A resistor 57 is connected from switch contact 40 to one input of an amplifier 58. The other input is grounded at 59. As before, a capacitor 60 is connected from the output to the input of amplifier 58 which is connected to resistor 57. A delay device 18 is connected from an input lead 44 to an actuating input lead 61 of switch 33. Switch 33 has a pole 62, and a contact 63. Pole 62 is connected to the said one input of amplifier 58. Contact 63 is connected to the output thereof. The output of delay device 18 is indicated by waveform (i) in FIG. 12. However, the pulse width and location of the output pulses of delay device 18 need not be exactly the same as that of waveform (i).

Since reset occupies a portion of the widths of pulses 49 and 53 for the first integrator 15 of FIG. 8, no special precautions need be taken in connection with the second integrator 16 of FIG. 9. Thus, the output pulses of delay device 18 provide for reset. The outputs of amplifiers 37 and 58 are shown in waveforms (g) and (h), respectively. The output of amplifier 58 drops to zero volts at 64 on a line 65 produced by reset pulse 66. The output of amplifier 58 then stays at zero volts between $t_3$ and $t_2$ and integrates from $t_2$ to $t_4$. The inverted pulse input on lead 56 terminates the integration and the output of amplifier 58 remains constant at the line 67 between times $t_4$ and $t_5$.

First and second integrators 15 and 16, respectively, effectively integrate for periods from $t_o$ to $t_2$, and from $t_2$ to $t_4$, respectively. Thus, switch 26 is closed for the period from $t_o$ to $t_2$, and switch 32 is closed from $t_2$ to $t_4$.

First integrator 15 shown in FIG. 8 integrates at a rate directly proportional to the constant voltage, E. Thus, second integrator 16, shown in FIG. 8, integrates at a rate directly proportional to the voltage upon input lead 38, this voltage being the output voltage of amplifier 37 in FIG. 8. The voltage on input lead 38 is integrated between $t_2$ and $t_4$ because switch 32 is closed during this time.

Sample and hold circuit 10 is shown in FIG. 10 including switch 19 having an arm 68 and a contact 69. An input lead 70 to switch 19 is connected from the output of amplifier 58, shown in FIG. 9. Switch 19 has an actuating input lead 45 connected from the output of multi-vibrator 42 shown in FIG. 8. The sample and hold circuit 10 of FIG. 10 thus samples the amplitude of waveform (h) between $t_0$ and $t_1$, between $t_4$ and $t_5$, etc. Note that switch 19 is closed over the duration of the pulses of waveform (f). The entire circuit 10 of FIG. 10 may be conventional. A capacitor 71 is connected from switch contact 69 to ground. An amplifier 72 has one input connected from switch contact 69 and another input which is grounded over a lead 73.

The invention produces a D.C. voltage at the output of circuit 10 directly proportional to the difference between the density of the fluid in which the densitometer probe is immersed, and a known, constant density.

If f is the resonant frequency of the vane 101, period, T, can be defined as, $$T = 1/f \qquad (1)$$

The densitometer of the present invention very accurately reproduces the equation, $$d = AT^2 + B \qquad (2)$$

where,
  d is density, and
  A and B are constants.

If $d_r$ is some known, fixed density for a period, $T_r$, then, $$d_r = AT_r^2 ]+ {}^B \quad (3)$$

Subtracting equation 3 from equation 2, $$d - d_r = A(T^2 - T_r^2) \quad (4)$$

Factoring and dividing by four, $$d - d_r = 4A(T/2 - T_r/2)(T/2 + T_r/2) \quad (5)$$

In FIG. 11, the output of divider 23 is indicated at waveform ($a$). Note that each pulse has a period, $T$, and that each pulse has a width $T/2$. In effect, pulse former 13 subtracts a known, constant pulse width from the first portion of each of the pulses ($a$). Call this portion $T_r/2$. The output pulses of gate 14 are shown at ($b$). Waveform ($c$) is ($a$) inverted. Pulses ($d$) appear at the output of pulse former 13.

Note that the period between the trailing edges of pulses ($d$) is T. The period between the trailing edge of the first and the leading edge of the next is thus, $$T - (T/2 - T_r/2) = (T/2 + T_r/2) \quad (6)$$

Integrators 15 and 16 thus perform the computation, $$(T/2 - T_r/2)(T/2 + T_r/2) \quad (7)$$

which is directly proportional to $d - d_r$. By adding the known constant, $d_r$, it is possible to arrive at absolute density.

Use of $d_r$ makes possible a more accurate computation and signal transmission because only the difference $d - d_r$ is computed and transmitted, and not absolute density, $d$.

Note that, $$d = A(T^2 - T_r^2) + d_r \quad (8)$$

where, $$d_r = AT_r^2 + B \quad (9)$$

Equation 8 gives the output of amplifier 72 in terms of a voltage directly proportional to d.

The word "spaced" as used herein and in the claims is hereby defined to include, but not be limited to, pulse spacing from center to center.

The word "densitometer**" is hereby defined for use herein and in the claims to include a device which may or may not have utilization means 103 as described herein.

The output of sample and hold circuit 10, shown in FIG. 10, is connected to lead 295 in switch 114, shown in FIG. 4. Lead 295 is connected to potential V1 by a potentiometer 296 and a resistor 297. Potentiometer 296 has a winding 298 and a wiper 299. Amplifier 198 has a minus input 300, and a plus input 301. Wiper 299 is connected to minus input 300 by a resistor 302. Plus input 301 is connected to potential V1. A resistor 303 and a potentiometer 304 are connected from potential V2 to ground. Potentiometer 304 has a winding 305 and a wiper 306. A resistor 307 is connected from wiper 306 to minus input 300. A transistor 308 has a collector 309, an emitter 310 and a base 311. A diode 312 is connected from the output of amplifier 198 to base 311. Collector 309 is connected to a positive source of potential. Emitter 310 is connected to an output junction 313. A resistor 314 is connected from junction 313 to the minus input 300 of the amplifier 198. An amplifier 315 has a minus input 316 and a plus input 317. Junction 313 is connected to minus input 316 by a resistor 318. Plus input 317 is connected to potential V1. A resistor 319 is connected from potential V2 to minus input 316. Transistors 320 and 321 are connected from the output of amplifier 315. Transistor 321 has a collector 325, an emitter 326 and a base 327. Base 324 is connected is connected from the output of amplifier 315. Collector 322 is connected to an output junction 328. Emitter 323 is connected to base 327. Emitter 326 is connected to minus input 316 of amplifier 315. Collector 325 is connected to junction 328. A milliammeter 329, a diode 330 and a resistor 331 are connected in series from junction 328. The output of switch 114 on lead 332 is between 4 and 20 milliamperes when transistor 195 does not short circuit the output of amplifier 198 to ground. Otherwise, there is a fixed current between 0 and 4 milliamperes. A resistor 333 shunts milliammeter 329.

For calibration, oscillator 116 in FIG. 1 may be turned on and adjusted to two frequencies of known outputs. Span potentiometer 296 and zero potentiometer 304 may then be adjusted.

The switches of oscillator 117, circuit 122 and counter 24, shown in FIG. 7, may all be ganged, if desired.

From the foregoing, it will be appreciated that synchronous detector 112 provides a sensitive device to detect whether or not resonance exists. At the same time, it actuates switch 114 to produce a constant output signal when resonance does not exist.

Still another feature of the present invention resides in the use of the output of amplifier 126 on lead 127 to supply operating power through transformer 143 to input circuit 106.

What is claimed is:

1. A vibration densitometer comprising: a probe; a structure mounted on said probe in a manner to be vibrated while immersed in a fluid; first means mounted on said probe to vibrate said structure; an electrical pick-off mounted on said probe in a position to produce at its output, alternating signals at least at some of the frequencies at which said structure vibrates; a regenerative loop connected from said pick-off output to said first means to vibrate said structure at its resonant frequency, said loop including a tracking filter having an input and an output, a driver amplifier connected from said tracking filter output to said first means, and second means connected from said pick-off output to said tracking filter input for impressing a periodic wave on said tracking filter, said periodic wave having an A.C. component of a frequency directly proportional to the frequency at which said structure vibrates; control means having first and second inputs and an output; output means connected from said tracking filter output to said control means first input for impressing a first signal on said control means first input which is proportional to the density of the said fluid surrounding said structure, said control means being actuable in response to a second sign impressed upon said second input thereof to produce a third signal at the output thereof, said third signal having a constant magnitude, said control means being deactuable in response to a fourth signal impressed upon said second input thereof to produce a fifth signal at the output thereof, said fifth signal being directly proportional to said first signal; third means connected from the input and the output of said tracking filter to said control means second input, said third means impressing said second signal on said control means second input when the tracking filter input and output signals have different frequencies, said third means impressing said fourth signal on said control means second input when the tracking filter input and output signals have the same frequency; and utilization means connected from said control means output.

2. The invention as defined in claim 1, wherein said third means includes a synchronous detector.

3. The invention as defined in claim 2, wherein said second means includes a first amplifier and a first squarer connected in succession from said pick-off to said tracking filter input, said synchronous detector being connected from the output of said first amplifier.

4. The invention as defined in claim 3, including a second amplifier and a second squarer connected from the tracking filter output, said driver amplifier being connected from the output of said second amplifier, a filter frequency control circuit connected to said tracking filter, and a phase detector connected from the outputs of said squarers to said control circuit, and a differentiator connected from the output of said second squarer to said synchronous detector and said output means.

5. A vibration densitometer comprising: a probe; a structure mounted on said probe in a manner to be vibrated while immersed in a fluid; first means mounted on said probe to vibrate said structure; an electrical pick-off mounted on said probe in a position to produce at its output, alternating signals at least at some of the frequencies at which said structure vibrates; a regenerative loop connected from said pick-off output to said first means to vibrate said structure at its resonant frequency, said loop including a tracking filter having an input and an output, a driver amplifier connected from said tracking filter output to said first means, and second means connected from said pick-off output to said tracking filter input for impressing an alternating signal on said tracking filter of a frequency equal to said resonant frequency; control means having first and second inputs and an output; output means connected from said tracking filter output to said control means first input for impressing a first signal on said control means first input which is proportional to the density of the said fluid surrounding said structure, said control means being actuable in response to a second signal impressed upon said second input thereof to produce a third signal at the output thereof, said third signal having a constant magnitude, said control means being deactuable in response to a fourth signal impressed upon said second input thereof to produce a fifth signal at the output thereof, said fifth signal being directly proportional to said first signal; third means connected from the input and the output of said tracking filter to said control means second input, said third means impressing said second signal on said control means second input when the tracking filter input and output signals have different frequencies, said third means impressing said fourth signal on said control means second input when the tracking filter input and output signals have the same frequency; and utilization means connected from said control means output.

6. The invention as defined in claim 5, wherein said third means includes a synchronous detector.

7. The invention as defined in claim 6, wherein said second means includes a first amplifier and a first squarer connected in succession from said pick-off to said tracking filter input, said synchronous detector being connected from the output of said first amplifier.

8. The invention as defined in claim 7, including a second amplifier and a second squarer connected from the tracking filter output, said driver amplifier being connected from the output of said second amplifier, a filter frequency control circuit connected to said tracking filter, and a phase detector connected from the outputs of said squarers to said control circuit, and a differentiator connected from the output of said second squarer to said synchronous detector and said output means.

9. A vibration densitometer comprising: a probe; a structure mounted on said probe in a manner to be vibrated while immersed in a fluid; first means mounted on said probe to vibrate said structure; an electrical pick-off mounted on said probe in a position to produce, at its output, alternating signals at least at some of the frequencies at which said structure vibrates; a regenerative loop including an input circuit, a first amplifier, a first squarer, a tracking filter, a second amplifier and a driver amplifier connected as successive stages in that order from the output of said pick-off to the input of said first means, said input circuit including preamplifier means for impressing an alternating signal on said first amplifier of an amplitude greater than that of the output signal of said pick-off but of the same frequency as the output signal of said pick-off; a synchronous detector having an output and first and second inputs; a linearization circuit having an input and an output; a differentiator; a second squarer connected from the output of said second amplifier to said differentiator, said differentiator having its input connected from said second squarer and its first and second outputs connected respectively to said synchronous detector first input and to said linearization circuit input; and control means having first and second inputs and an output, said control means first input being connected from said linearization circuit output; and utilization means connected from said control means output, said control means second input being connected from said synchronous detector output, said synchronous detector second input being connected from the output of said first amplifier said linearization circuit including means for impressing a signal on said control means first input directly proportional to the density of the said fluid in which said structure is immersed.

10. The invention as defined in claim 9, including a filter frequency control circuit connected to said tracking filter, and a phase detector connected from the outputs of said squarers to said control circuit.

* * * * *